United States Patent
Liao et al.

(10) Patent No.: US 11,639,420 B2
(45) Date of Patent: May 2, 2023

(54) MODIFIED BISMALEIMIDE RESIN, METHOD FOR PREPARING THE SAME, PREPREG, COPPER CLAD LAMINATE AND PRINTED CIRCUIT BOARD

(71) Applicant: NAN YA PLASTICS CORPORATION, Taipei (TW)

(72) Inventors: Te-Chao Liao, Taipei (TW); Hao-Sheng Chen, Taipei (TW); Hung-Yi Chang, Taipei (TW); Chi-Lin Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/004,206

(22) Filed: Aug. 27, 2020

(65) Prior Publication Data
US 2021/0122879 A1  Apr. 29, 2021

(30) Foreign Application Priority Data
Oct. 29, 2019 (TW) ................. 108138990

(51) Int. Cl.
*C08G 73/12* (2006.01)
*C08J 5/24* (2006.01)
*B32B 15/20* (2006.01)

(52) U.S. Cl.
CPC ............ *C08G 73/128* (2013.01); *B32B 15/20* (2013.01); *C08G 73/12* (2013.01); *C08G 73/121* (2013.01); *C08J 5/24* (2013.01); *B32B 2457/08* (2013.01)

(58) Field of Classification Search
CPC .... C08G 73/128; C08G 73/12; C08G 73/121; C08G 73/124
See application file for complete search history.

(56) References Cited

U.S. PATENT DOCUMENTS

| | | | | |
|---|---|---|---|---|
| 4,598,115 | A | * | 7/1986 | Fujioka ................. B32B 27/34 524/376 |
| 2003/0181580 | A1 | * | 9/2003 | Kodemura ............ C08F 283/14 525/63 |
| 2007/0155047 | A1 | * | 7/2007 | Jayaraman .............. H01L 24/29 257/E21.503 |

FOREIGN PATENT DOCUMENTS

| | | |
|---|---|---|
| CN | 1493610 A | 5/2004 |
| CN | 104093779 A | 10/2014 |
| EP | 0352868 A1 | 1/1990 |
| JP | 2018115156 A | 7/2018 |
| TW | I335917 B | 1/2011 |
| TW | I437026 B | 5/2014 |

OTHER PUBLICATIONS

Hu et al.; Journal of Applied Polymer Science, 2008, vol. 107, p. 1288-1293.*

* cited by examiner

*Primary Examiner* — Robert S Jones, Jr.
(74) *Attorney, Agent, or Firm* — Li & Cai Intellectual Property (USA) Office

(57) ABSTRACT

A modified bismaleimide resin, a method for preparing the same, a prepreg, a copper clad laminate, and a printed circuit board are provided. The modified bismaleimide resin is formed by reacting a diamine having a specific structure with maleic anhydride, and has greater amounts of non-polar and hydrophobic groups in the molecular structure thereof.

5 Claims, 5 Drawing Sheets

MODIFIED BISMALEIMIDE RESIN, METHOD FOR PREPARING THE SAME, PREPREG, COPPER CLAD LAMINATE AND PRINTED CIRCUIT BOARD

CROSS-REFERENCE TO RELATED PATENT APPLICATION

This application claims the benefit of priority to Taiwan Patent Application No. 108138990, filed on Oct. 29, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a bismaleimide resin, and more particularly to a modified bismaleimide resin with excellent comprehensive performance and its applications, such as a prepreg, a copper clad laminate, and a printed circuit board.

BACKGROUND OF THE DISCLOSURE

In recent years, with the development trends of electronic products leaning towards multifunctionalization and miniaturization, the requirements for circuit boards are getting higher. Therefore, circuit boards have been gradually designed to have a multi-layered, high density wiring, and high-speed signal transmission structure. The dielectric properties of a polymer material such as dielectric constant (Dk) and dissipation factor (Df) are important indicators that affect the signal transmission speed and signal quality. While the polymer material has a lower dielectric constant value, a faster signal transmission speed can be achieved; and while the polymer material has a lower dissipation factor, a reduced signal transmission loss can be achieved. In certain applications such as high-frequency printed circuit boards, the polymer material needs to have a very low dielectric constant (Dk) and dissipation factor (Df), along with high heat resistance, good molding processability, excellent comprehensive mechanical properties, and environmental aging resistance.

Copper clad laminate (CCL) is a base material of a printed circuit board, which is composed of a thermoplastic resin(s), reinforcing material(s), and copper foil(s). Although polyimide (PI), polyphenylene ether, polytetrafluoroethylene, polystyrene, ultra-high molecular weight polyethylene, polyphenylene sulfide and polyether ketone, each of which can serve as the thermoplastic resin, have excellent electrical properties and good toughness, they are poor in molding processability and solvent solubility. Also, these resins are unfavorable for processing and thus are limited in application since they have a high melting point, high melt viscosity, and poor adhesion to fibers. In addition, epoxy resins, phenolic resins, unsaturated polyesters, etc. have poor heat resistance, humidity resistance, and high dissipation factor, such that meeting the requirements of certain special applications can be challenging.

Bismaleimide (BMI), based on its compact and robust structure, has excellent dielectric properties and physical properties including good thermal stability, strong mechanical properties, high glass transition temperature (Tg), and high toughness, and therefore is often used for the copper clad laminates. However, a general structure of bismaleimide resin has low toughness, brittleness, and poor processability. Moreover, a low solvent solubility and high dielectric constant results in a lot more difficulties for applications of the bismaleimide resin.

The BMI needs to be modified so as to increase the applicability, and there are multiple ways for modification. For example, the BMI may be modified by aromatic diamines, epoxy resins, thermoplastic resins, rubbers, sulfur compounds, or allyl compounds. Also, a number of BMIs having different structures may be used together for modification, and a chain extension or synthesis way may be used for modification. Although a modified BMI has improvement(s) in one or more properties, it cannot provide a balance between different properties required for a target application. For example, the modified BMI has an increase in toughness, but it is difficult to decrease its dielectric constant and dissipation factor.

SUMMARY OF THE DISCLOSURE

In response to the above-referenced technical inadequacies, the present disclosure provides a modified bismaleimide resin, the molecular structure of which has greater amounts of non-polar and hydrophobic groups. The modified bismaleimide resin has improved toughness, heat resistance, and solvent solubility, and is not easily polarized by electric fields, resulting in low dielectric properties that are as expected. The present disclosure further provides a prepreg using the modified bismaleimide resin, a copper clad laminate, and a printed circuit board.

In one aspect, the present disclosure provides a modified bismaleimide resin characterized by having a structure represented by formula (1):

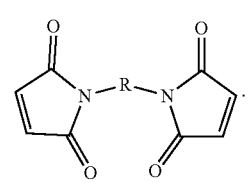

formula (1)

In formula (1), R is one of a molecular group represented by formulae (2) to (4):

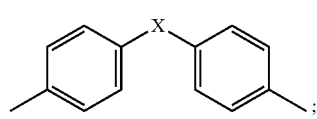

formula (2)

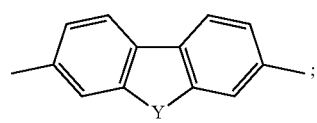

formula (3)

-continued

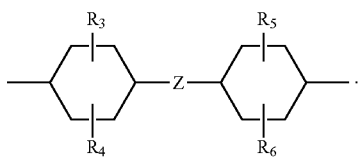
formula (4)

In formula (2), X is a carbon atom or one of the following molecular groups:

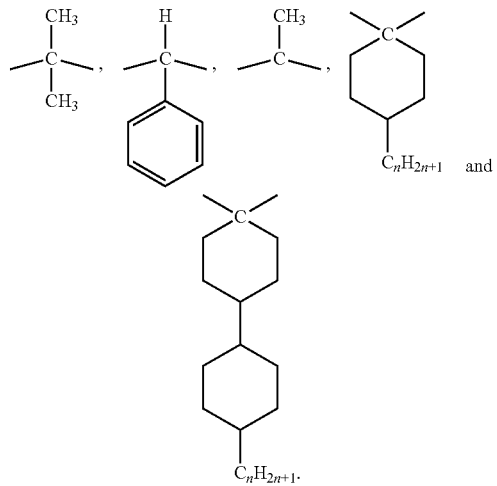

In formula (3), Y is one of the following molecular groups:

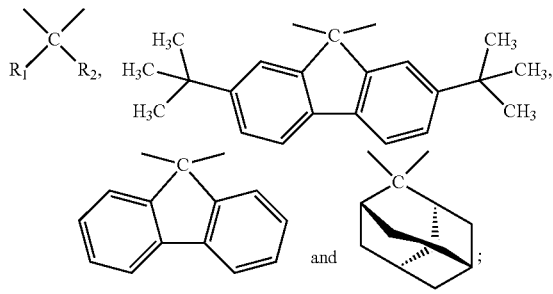

$R_1$ and $R_2$ are each independently a benzyl group or an alkyl group having 1 to 10 carbon atoms. In formula (4), $R_3$ to $R_6$ are each independently an alkyl group having 1 to 10 carbon atoms, and Z is an oxygen atom, carbon atom or one of the following molecular groups:

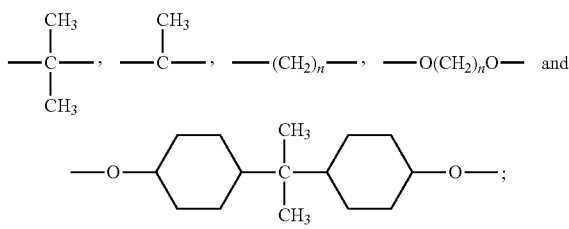

n is a positive integer between 5 and 20.

In another aspect, the present disclosure provides a modified bismaleimide resin characterized by having a structure represented by formula (1):

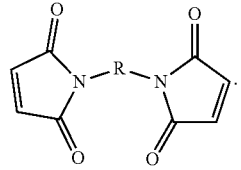
formula (1)

In formula (1), R is a molecular group represented by formula (5):

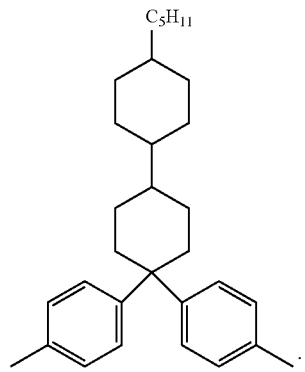
formula (5)

In certain embodiments, the method for preparing the modified bismaleimide resin having the above-mentioned chemical structures, includes: providing a reactor with a stirring mixer; placing a reaction solution into the reactor, the reaction solution including a diamine having a non-polar backbone structure, maleic anhydride and a solvent, wherein a molar ratio of the diamine to maleic anhydride is 1:2-3; starting the stirring mixer to mix the reaction solution and adding a catalyst to the reaction solution; carrying out a synthesis reaction at normal pressure and a reaction temperature of 90 to 150° C. for 12 to 25 hours to obtain a viscous resin solution.

In another aspect, the present disclosure provides a prepreg formed by applying a resin material, which includes the modified bismaleimide resin having the above-mentioned chemical structures, to a substrate, and drying the resin material.

In still another aspect, the present disclosure provides a copper clad laminate, including the prepreg, which is based on the modified bismaleimide resin having the above-mentioned chemical structures, and a copper foil layer formed on the prepreg.

In still another aspect, the present disclosure provides a printed circuit board formed by patterning the copper foil layer of the copper clad laminate as mentioned above.

The modified bismaleimide resin of the present disclosure, compared to a bismaleimide resin with the general structure, has the effects as follows:
1. The modified bismaleimide with a special molecular structure has an increase in toughness, a decrease in brittleness, an increase in heat resistance, and an increase in solvent solubility, e.g., has a solubility of at least 25% in acetone.

2. The modified bismaleimide has a molecular structure with greater amounts of non-polar and hydrophobic groups, and it is therefore not easily polarized by electric fields so as to have excellent low dielectric properties. The modified bismaleimide resin has a dielectric constant (Dk) less than 2.6 and a dissipation factor (Df) less than 0.003 at 10 GHz.
3. The modified bismaleimide resin has a glass transition temperature (Tg) greater than 250° C.

The modified bismaleimide resin of the present disclosure can be mixed with other compounds having unsaturated groups to achieve desired properties required for a target application (e.g., a copper foil laminate), for example, better heat resistance and toughness or lower dielectric constant and dissipation factor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
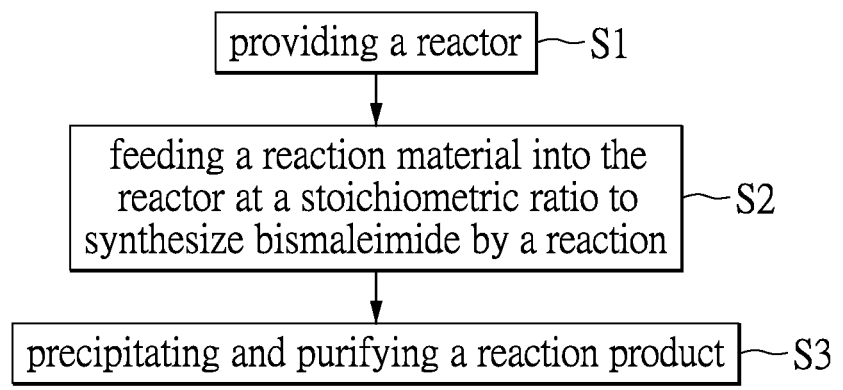
FIG. 1 is a flowchart of a method for preparing a modified bismaleimide resin of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In order to meet the requirements of a target application, the present disclosure uses a diamine having a non-polar backbone structure and maleic anhydride to carry out an organic synthesis reaction, such that the resulting bismaleimide resin has a molecular structure with greater amounts of non-polar and hydrophobic groups and therefore has improved mechanical and electrical properties, heat resistance, solvent solubility, processability and formability.

The present disclosure provides a modified bismaleimide resin that has a structure represented by the following formula (1):

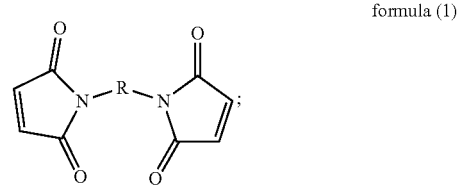

formula (1)

In formula (1), R is a molecular group represented by one of the following formula (2), (3) or (4):

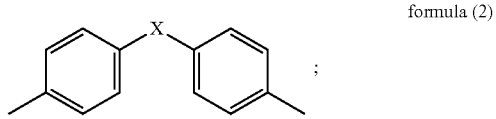

formula (2)

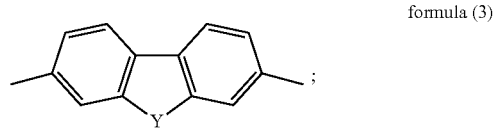

formula (3)

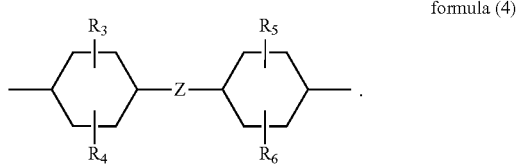

formula (4)

In formula (2), X is a carbon atom or one of the following molecular groups:

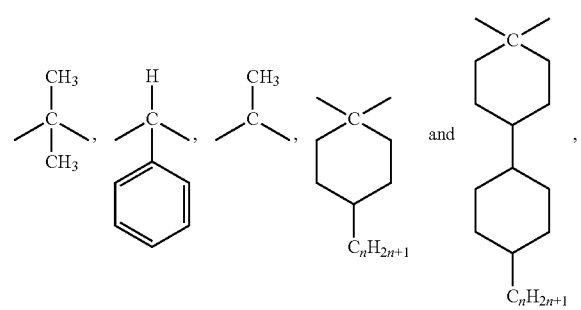

in which n is a positive integer between 0 and 20.

In formula (3), Y is one of the following molecular groups:

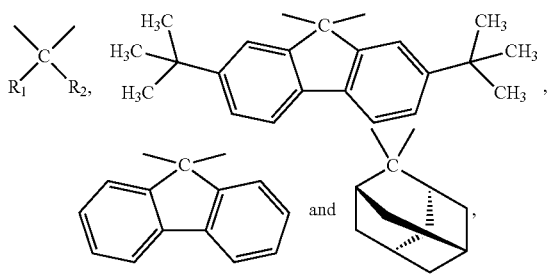

in which $R_1$ and $R_2$ are each independently a benzyl group or an alkyl group having 1 to 10 carbon atoms. In formula (4), $R_3$ to $R_6$ are each independently an alkyl group having 1 to 10 carbon atoms, and Z is an oxygen atom, carbon atom or one of the following molecular groups:

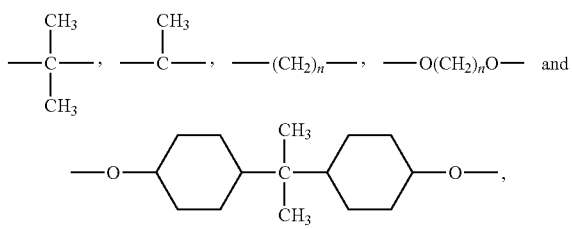

in which n is a positive integer between 0 and 20.

In certain embodiments, R in formula (1) is the molecular group represented by formula (5):

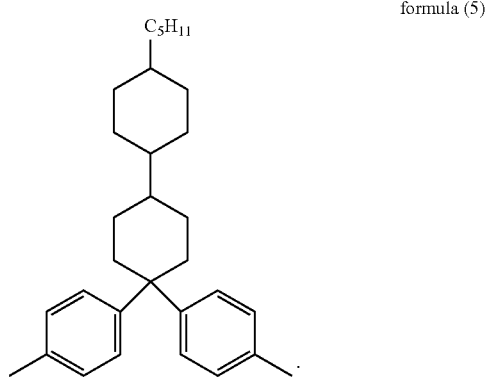

formula (5)

It is worth mentioning that, the modified bismaleimide resin has a special chemical structure and therefore it has an increase in toughness, a decrease in brittleness, an increase in heat resistance, and an increase in solvent solubility. Moreover, the structure of the modified bismaleimide resin has greater amounts of non-polar and hydrophobic groups, such that it is not easily polarized by electric fields so as to have excellent low dielectric properties. In addition, the modified bismaleimide resin has a high glass transition temperature (Tg). More specifically, the modified bismaleimide resin has a dielectric constant (Dk) less than 2.6 and a dissipation factor (Df) less than 0.003 at 10 GHz. The modified bismaleimide resin has a glass transition temperature greater than 250° C. The modified bismaleimide resin has a solubility to acetone of at least 25%.

According to actual requirements, the modified bismaleimide resin can be used together with one or more compounds having unsaturated groups to achieve desired properties for a target application such as a copper clad laminate, for example, better heat resistance and toughness or lower dielectric constant and dissipation factor. Specific examples of the compound includes: vinyl compounds such as ethylene, propylene, styrene, divinylbenzene and divinylbiphenyl; methacrylates resulted from monatomic or polyatomic alcohol(s) such as methyl methacrylate, 2-hydroxyethyl methacrylate, 2-hydroxypropyl methacrylate, polypropylene glycol dimethacrylate, trimethylolpropane diacrylate, trimethylolpropane triacrylate, pentaerythritol tetramethacrylate and dipentaerythritol hexamethacrylate; epoxy methacrylates such as bisphenol A epoxy methacrylate and bisphenol F epoxy methacrylate; and benzocyclobutene resin.

Referring to FIG. 1, the modified bismaleimide resin can be prepared with the following steps: step S1, providing a reactor; step S2, feeding a reaction material into the reactor at a stoichiometric ratio to synthesize bismaleimide by a reaction; and step S3, precipitating and purifying a reaction product.

More specifically, the reactor has a stirring mixer disposed therein. In step S2, the reaction material is in the form of a reaction solution, which includes a diamine having a non-polar backbone structure, maleic anhydride, and a solvent. The reaction solution has a solid content between 10 wt % and 60 wt %, and preferably between 40 wt % and 60 wt %, in which a molar ratio of the diamine to maleic anhydride is 1:2-3. The solvent is an aprotic polar solvent that is at least one selected from acetone, N,N-dimethylformamide (DMF), and toluene.

The synthesis reaction is carried out under normal pressure, a reaction temperature ranging between room temperature and 200° C., and in the presence of at least one catalyst and a dehydrating agent. After a reaction time of 1 to 3 hours, bismaleimide will be formed, and if the reaction is continued for 1 to 5 hours, bismaleimide resin will be present in the reaction solution. The catalyst can be added to the reaction solution in the form of drops. The catalyst can be selected from acetic acid, sodium acetate, and triethylamine, preferably including acetic acid, sodium acetate, and triethylamine Before carrying out the synthesis reaction, nitrogen gas can be inputted into the reactor to remove air and water vapor. However, these details provided by the present embodiment are merely exemplary and are not meant to limit the scope of the present disclosure.

In step S2, the diamine having a non-polar backbone structure can be selected from diamines A to E respectively represented by formulae (6) to (10).

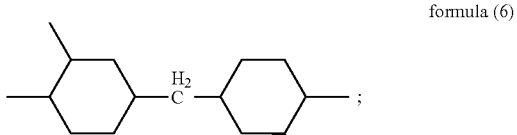

formula (6)

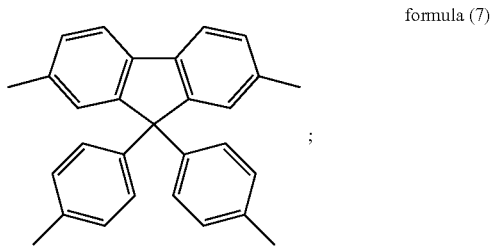

formula (7)

-continued

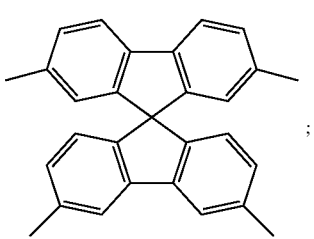

formula (8)

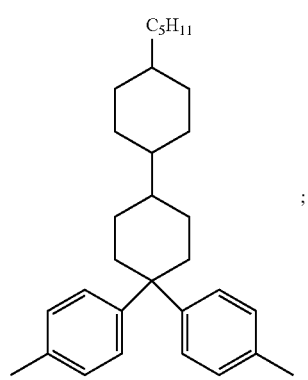

formula (9)

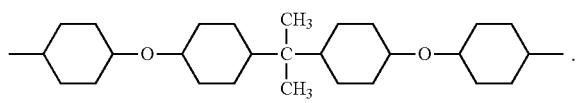

formula (10)

In step S3, an appropriate amount of water is added to the reaction solution and the stirring mixer starts to stir for a period of time, such that resin particles or solutions are gradually precipitated in the reaction solution. A bismaleimide resin is obtained after the reaction solution is filtered and vacuum dried.

Example 1

47.7 g (0.2 mol) of the diamine A and 43.1 g (0.44 mol) of maleic anhydride were dissolved in 300 ml of acetone. The resulting reaction solution was fed into a 500 ml four-neck round-bottom flask having a stirring mixer disposed therein. Nitrogen gas was inputted into the reaction flask to remove air and water vapor. The stirring mixer uniformly mixed the reaction solution under normal pressure at a rotation speed of 300 rpm.

Figure 2:
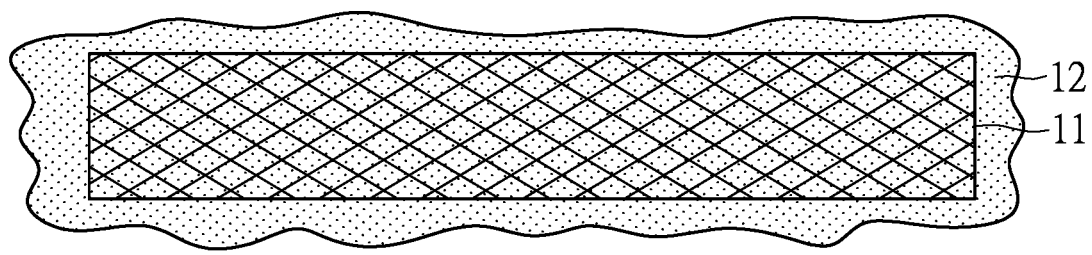
FIG. 2 is a schematic view showing a manufacturing process of a prepreg of the present disclosure.

The solid ingredients of the reaction solution were completely dissolved at a reaction temperature of 80° C., which turned into a clear reddish brown color. At this time, 4 g of sodium acetate, 140 ml of acetic anhydride, and 28 ml of triethylamine were added to the reaction solution in a dropwise manner. The reaction was carried out at a reaction temperature of 90° C. for 12 hours. After the completion of the reaction, the reaction solution turned into a dark reddish brown color from the clear reddish brown color, i.e., the reaction solution exhibited high tackiness. After that, precipitation and purification processes were performed to obtain slight brown resin particles from the dark reddish brown reaction solution. 80 g of high purity bismaleimide resin particles (hereinafter referred to as BMI-A resin particles) with a reddish brown color were obtained after removing impurities such as unreacted monomers and residual acids. The BMI-A resin particles were used to manufacture a copper clad laminate for testing, the results of which are shown in FIG. 2.

Example 2

The preparing method and the reaction conditions of Example 2 are the same as those used in Example 1. The differences are that 69.7 g of the diamine B and 43.1 g of maleic anhydride serving as reaction monomers were dissolved in 245 ml of DMF, 4.5 g of sodium acetate, 152 ml of acetic anhydride, and 30 ml of triethylamine serving as catalysts were added to the resulting reaction solution, and the reaction time was changed to 20 hours. Accordingly, 85 g of high purity bismaleimide resin particles (hereinafter referred to as BMI-B resin particles) with a dark brown color were obtained. The BMI-B resin particles were used to manufacture a copper clad laminate for testing, the results of which are shown in FIG. 2.

Example 3

The preparing method and the reaction conditions of Example 3 are the same as those used in Example 1. The differences are that 69.2 g of the diamine C and 43.1 g of maleic anhydride serving as reaction monomers were dissolved in 266 ml of DMF, 3.4 g of sodium acetate, 130 ml of acetic anhydride, and 35 ml of triethylamine serving as catalysts were added to the resulting reaction solution, the reaction temperature was changed to 120° C. and the reaction time was 15 hours. Accordingly, 90 g of high purity bismaleimide resin particles (hereinafter referred to as BMI-C resin particles) with a reddish brown color were obtained. The BMI-C resin particles were used to manufacture a copper clad laminate for testing, the results of which are shown in FIG. 2.

Example 4

The preparing method and the reaction conditions of Example 4 are the same as those used in Example 1. The differences are that 75.3 g of the diamine D and 43.1 g of maleic anhydride serving as reaction monomers were dissolved in 270 ml of toluene, 4.7 g of sodium acetate, 132 ml of acetic anhydride and 40 ml of triethylamine serving as catalysts were added to the resulting reaction solution, the reaction temperature was changed to 150° C. and the reaction time was 18 hours. Accordingly, 83 g of high purity bismaleimide resin particles (hereinafter referred to as BMI-D resin particles) with a reddish brown color were obtained. The BMI-D resin particles were used to manufacture a copper clad laminate for testing, the results of which are shown in FIG. 2.

Example 5

The preparing method and the reaction conditions of Example 5 are the same as those used in Example 1. The differences are that 86.9 g of the diamine E and 43.1 g of maleic anhydride serving as reaction monomers were dissolved in 430 ml of toluene, 3 g of sodium acetate, 156 ml of acetic anhydride, and 44 ml of triethylamine serving as catalysts were added to the resulting reaction solution, the reaction temperature was changed to 100° C. and the reaction time was 25 hours. Accordingly, 95 g of high purity bismaleimide resin particles (hereinafter referred to as BMI-E resin particles) with a slight yellow color were obtained. The BMI-E resin particles were used to manufacture a copper clad laminate for testing, the results of which were shown in FIG. 2.

COMPARATIVE EXAMPLE

Bis(3-ethyl-5-methyl-4-(N-maleimido)phenyl)methane (BMI-5100 manufactured by Daiwakasei Industry Co., Ltd.) produced a copper clad laminate for testing, the results of which were shown in FIG. 2.

TABLE 1

| | | Examples | | | | |
|---|---|---|---|---|---|---|
| Items | | 1 | 2 | 3 | 4 | 5 |
| Reaction monomer | Diamine A (g) | 47.7 | | | | |
| | Diamine B (g) | | 69.7 | | | |
| | Diamine C (g) | | | 69.2 | | |
| | Diamine D (g) | | | | 75.3 | |
| | Diamine E (g) | | | | | 86.9 |
| | Maleic anhydride (g) | 43.1 | 43.1 | 43.1 | 43.1 | 43.1 |
| Solvent | Acetone (ml) | 300 | | | | |
| | DMF (ml) | | 245 | 266 | | |
| | Toluene (ml) | | | | 270 | 430 |
| Catalyst | Sodium acetate (g) | 4 | 4.5 | 3.4 | 4.7 | 3 |
| | Acetic anhydride (ml) | 140 | 152 | 130 | 132 | 156 |
| | Triethylamine (ml) | 28 | 30 | 35 | 40 | 44 |
| Reaction condition | Pressure | Normal pressure | Normal pressure | Normal pressure | Normal pressure | Normal pressure |
| | Temperature (° C.) | 90 | 90 | 120 | 150 | 100 |
| | Time (Hr) | 12 | 20 | 15 | 18 | 25 |

TABLE 2

| | Examples | | | | | Comparative Example |
|---|---|---|---|---|---|---|
| Items | 1 | 2 | 3 | 4 | 5 | (BMI-5100) |
| Tg (° C.) | 213 | 295 | 271 | 214 | 207 | 225 |
| Dk (10 GHz) | 2.45 | 2.76 | 2.81 | 2.54 | 2.38 | 2.65 |
| Df (10 GHz) | 0.0026 | 0.0035 | 0.0033 | 0.0040 | 0.0027 | 0.0041 |
| Solubility (%) | 35 | 25 | 25 | 30 | 35 | 20 |
| Product appearance (Color of resin particles) | Reddish brown | Dark brown | Reddish brown | Reddish brown | Slight yellow | |

Test methods of key properties as shown in Table 2:
1. The glass transition temperatures (Tg) were tested by a differential scanning calorimeter (TA 2100 DSC).
2. The dielectric constants (Dk) and dissipation factors (Df) were tested by a dielectric analyzer (HP Agilent E4991A) at a frequency of 10 GHz.
3. The solubilities were tested by acetone and represented by weight percentage.

Figure 3:
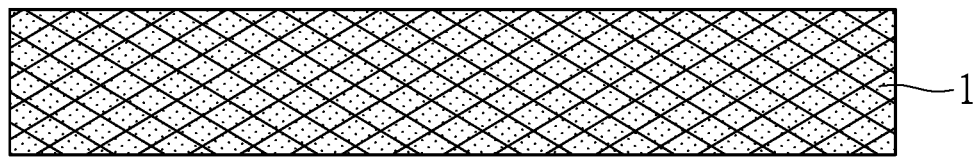
FIG. 3 is a structural schematic view of the prepreg of the present disclosure.

Referring to FIG. 2 and FIG. 3, the modified bismaleimide resin of the present disclosure can be used to manufacture a prepreg 1. The prepreg 1 can be formed by applying a resin material 12 including the modified bismaleimide resin to a substrate 11 (e.g., an insulating paper, a glass fiber cloth, or another fiber material) and drying the resin material 12. More specifically, the resin material 12 may be in the form of a resin varnish, and may be applied in a coating or impregnating manner. The substrate 11 with the resin material 12 can be dry treated at a suitable temperature for a period of time to form the prepreg 1 that is in a semi-hardened state.

The resin material 12 may further include functional additives to increase the properties required for actual applications, which may be at least one selected from a flame retardant, a solvent, a filler, and a hardening accelerator.

Figure 4:
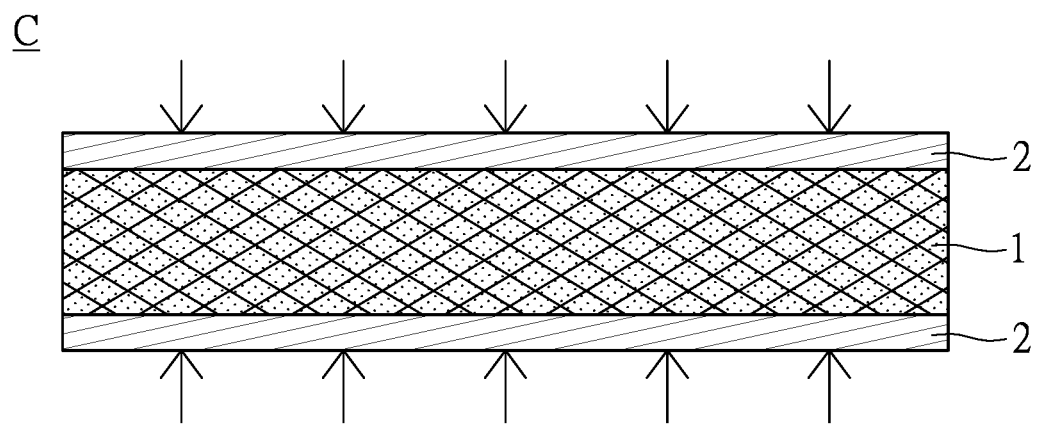
FIG. 4 is a schematic view showing a manufacturing process of a copper clad laminate of the present disclosure.

Referring to FIG. 4, the aforementioned prepreg 1 can be used to manufacture a copper clad laminate C. More specifically, the copper clad laminate C can be manufactured by laminating a copper foil layer 2 on one side or both sides of at least one of the prepreg 1, and hot pressing the resulting structure. There are no particular restrictions on the conditions for hot pressing, which can be adjusted according to the composition of the resin material 12.

Figure 5:
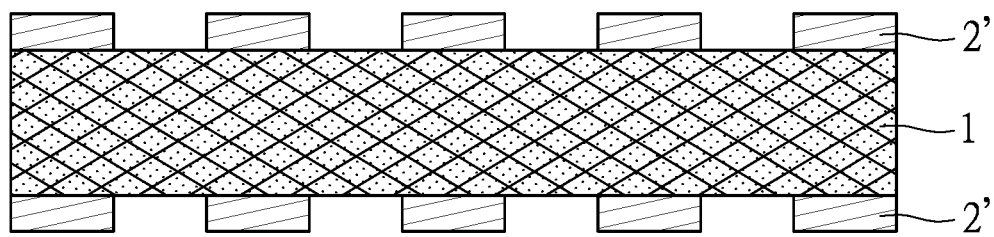
FIG. 5 is a structural schematic view of a printed circuit board of the present disclosure.

Referring to FIG. 5, the aforementioned copper clad laminate C can be used to manufacture a printed circuit board P. More specifically, the printed circuit board P can be manufactured by patterning the copper foil layer 2 of the copper clad laminate C. That is, the copper foil layer 2 is formed into a circuit layer 2' that has a specific circuit pattern. The copper foil layer 2 may be patterned by lithography and etching, but it is not limited thereto.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A modified bismaleimide resin characterized by having a structure represented by formula (1):

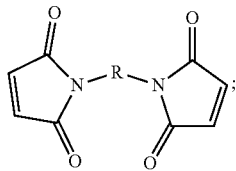

formula (1)

wherein, in formula (1), R is a molecular group represented by formula (2):

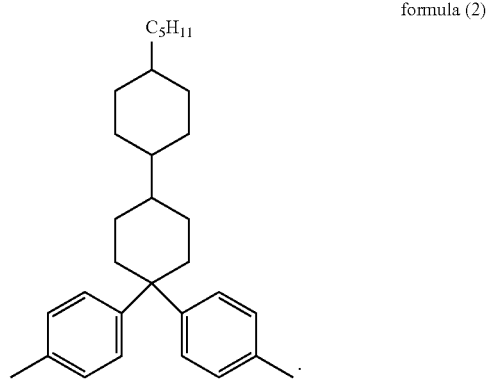

formula (2)

2. A method for preparing the modified bismaleimide resin as claimed in claim 1, comprising:
    providing a reactor with a stirring mixer;
    placing a reaction solution into the reactor, the reaction solution includes a diamine having a non-polar backbone structure, maleic anhydride, and a solvent, wherein a molar ratio of the diamine to maleic anhydride is 1:2-3;
    starting the stirring mixer to mix the reaction solution and adding a catalyst to the reaction solution; and
    carrying out a synthesis reaction at normal pressure and a reaction temperature of 90 to 150° C. for 12 to 25 hours to obtain a viscous resin solution.

3. The method according to claim 2, further comprising separating the modified bismaleimide resin from the viscous resin solution and removing impurities from the modified bismaleimide resin.

4. The method according to claim 2, wherein the reaction solution has a solid content between 40 wt % and 60 wt %.

5. The method according to claim 2, wherein the solvent is acetone, N, N-dimethylformamide (DMF), or toluene, and the catalyst includes acetic acid, sodium acetate, and triethylamine.

* * * * *